US007596696B1

(12) United States Patent
Perlman

(10) Patent No.: US 7,596,696 B1
(45) Date of Patent: Sep. 29, 2009

(54) EFFICIENTLY MANAGING KEYS TO MAKE DATA PERMANENTLY UNREADABLE

(75) Inventor: Radia J. Perlman, Sammamish, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 768 days.

(21) Appl. No.: 11/214,958

(22) Filed: Aug. 29, 2005

(51) Int. Cl.
*H04L 9/00* (2006.01)

(52) U.S. Cl. ..................................... 713/165
(58) Field of Classification Search ............... 380/277, 380/281; 713/165, 167, 189, 193, 194; 707/200, 707/202
See application file for complete search history.

(56) References Cited

U.S. PATENT DOCUMENTS 6,134,660 A * 10/2000 Boneh et al. ............... 713/193

6,363,480 B1 3/2002 Perlman ..................... 713/164

OTHER PUBLICATIONS

Publication: "*A Revocable Backup System*" By Boney and Lipton, In Proceedings 6th USENIX Security Conference, pp. 91-96, 1996.

* cited by examiner

*Primary Examiner*—Beemnet W Dada
(74) *Attorney, Agent, or Firm*—Park, Vaughan & Flemming LLP

(57) ABSTRACT

One embodiment of the present invention provides a system that facilitates making the files permanently unreadable. During operation, the system encrypts a file with a key K at a file manager and then stores the encrypted file in non-volatile storage. Next, the system stores the key K in a key database located in volatile storage at the file manager. The system then encrypts the key database, and stores the encrypted key database in non-volatile storage. Additionally, a key that can be used to decrypt the encrypted key database is maintained by a key manager, and is not maintained in non-volatile form by the file manager. In this way, if the file manager crashes, losing the contents of its volatile storage, the file manager must interact with the key manager to decrypt the encrypted key database.

19 Claims, 3 Drawing Sheets

EFFICIENTLY MANAGING KEYS TO MAKE DATA PERMANENTLY UNREADABLE

BACKGROUND

1. Field of the Invention

The present invention relates to techniques for encrypting and decrypting data. More specifically, the present invention relates to a method and an apparatus for encrypting data and managing keys to facilitate making data permanently unreadable.

2. Related Art

To ensure data is not lost prematurely, it is common to create multiple backup copies of the data. However, it is also desirable in some cases to ensure that a file, once deleted, is not recoverable. This can be a rather complicated task if backup copies of the data are created and stored at different locations.

This problem can be solved by only storing the data in encrypted form. In this way, destroying the data is a somewhat easier problem because only the key must be deleted. However, long-term user keys can, over time, be obtained by an adversary through compromise or coercion. To remedy this problem, it is possible for keys to be kept in tamper-resistant smart cards, in which case it is not feasible to covertly discover the keys. To delete the data, the user need only destroy the smart card. However, it is expensive to require every user to have a smart card and every computer to have a smart card reader.

A more-sophisticated technique for managing secret keys (developed by a company called "Disappearing Inc.") uses a special server called an "ephemerizer" whose job it is to create and destroy keys. A nice property of this technique is that the ephemerizer can be built so it does not see any data. However, the ephemerizer must create and store a key for every ephemerally-created message. This can involve storing a large amount of data if the system is used to encrypt many messages. (Also see a related system disclosed in U.S. Pat. No. 6,363,480, entitled "Ephemeral Decryptability," by inventor Radia J. Perlman.)

This storage-space problem can be alleviated by modifying the ephemerizer so that it only maintains one key per expiration time, and having that key used across many users and many files. (See U.S. patent application Ser. No. 10/959,928, filed on 5 Oct. 2004, entitled "Method and Apparatus for Using Secret Keys to Make Data Permanently Unreadable," by inventor Radia J. Perlman. This application is hereby incorporated by reference to disclose how an ephemerizer is designed and operates.)

However, this approach does not provide a scalable solution when a file is deleted on demand, since if a key is used for multiple files, that key cannot be deleted without making all other files encrypted with that key unreadable.

Hence, what is needed is a method and an apparatus that facilitates making data disappear without the above-described problems.

SUMMARY

One embodiment of the present invention provides a system that facilitates making the files permanently unreadable. During operation, the system encrypts a file with a key K at a file manager and then stores the encrypted file in non-volatile storage. Next, the system stores the key K in a key database located in volatile storage at the file manager. The system then encrypts the key database, and stores the encrypted key database in non-volatile storage. Additionally, a key that can be used to decrypt the encrypted key database is maintained by a key manager, and is not maintained in non-volatile form by the file manager. In this way, if the file manager crashes, losing the contents of its volatile storage, the file manager must interact with the key manager to decrypt the encrypted key database.

In a variation on this embodiment, encrypting the key database involves encrypting the key database with a key X and then encrypting the key X with a key $P_N$ to form an encrypted key. This encrypted key and the encrypted key database are stored in non-volatile storage.

In a further variation, $P_N$ is a public key, which is associated with a corresponding private key maintained by the key manager.

In a further variation, $P_N$ is a secret key, which is maintained by the key manager.

In a variation on this embodiment, the method further comprises making a file permanently unreadable. This involves removing the key K from the key database at the file manager to produce a modified key database. Next, the system encrypts the modified key database with a successive key $P_{N+i}$ to form an encrypted modified key database. This successive key $P_{N+i}$ is maintained by the key manager (which involves maintaining a corresponding private key if $P_{N+i}$ is a public key). The system then stores the encrypted modified key database in non-volatile storage, and eventually causes the key manager to delete the key $P_N$, which involves deleting a corresponding private key if $P_N$ is a public key.

In a variation on this embodiment, upon recovering from a crash, the system retrieves the encrypted key database and the encrypted key from non-volatile storage. Next, the system communicates with the key manager to decrypt the encrypted key, thereby restoring the key X. The system then uses the key X to decrypt the encrypted key database at the file manager, thereby enabling the file manager to decrypt encrypted files.

In a further variation, communicating with the key manager to decrypt the encrypted key can involve: communicating with the key manager through a secure exchange; or using a blind decryption scheme to decrypt the encrypted key.

In a variation on this embodiment, the key that can be used to decrypt the encrypted key database is maintained by multiple key managers.

In a variation on this embodiment, the key database is encrypted using a k-out-of-n scheme with n key managers, such that as long as k key managers are available, the encrypted key database can be decrypted.

In a variation on this embodiment, storing the encrypted key database in non-volatile storage involves: storing a copy of the encrypted key database in local non-volatile storage associated with the file manager; and storing additional copies of the encrypted key database in remote non-volatile storage.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

File Manager and Key Manager

Figure 1:
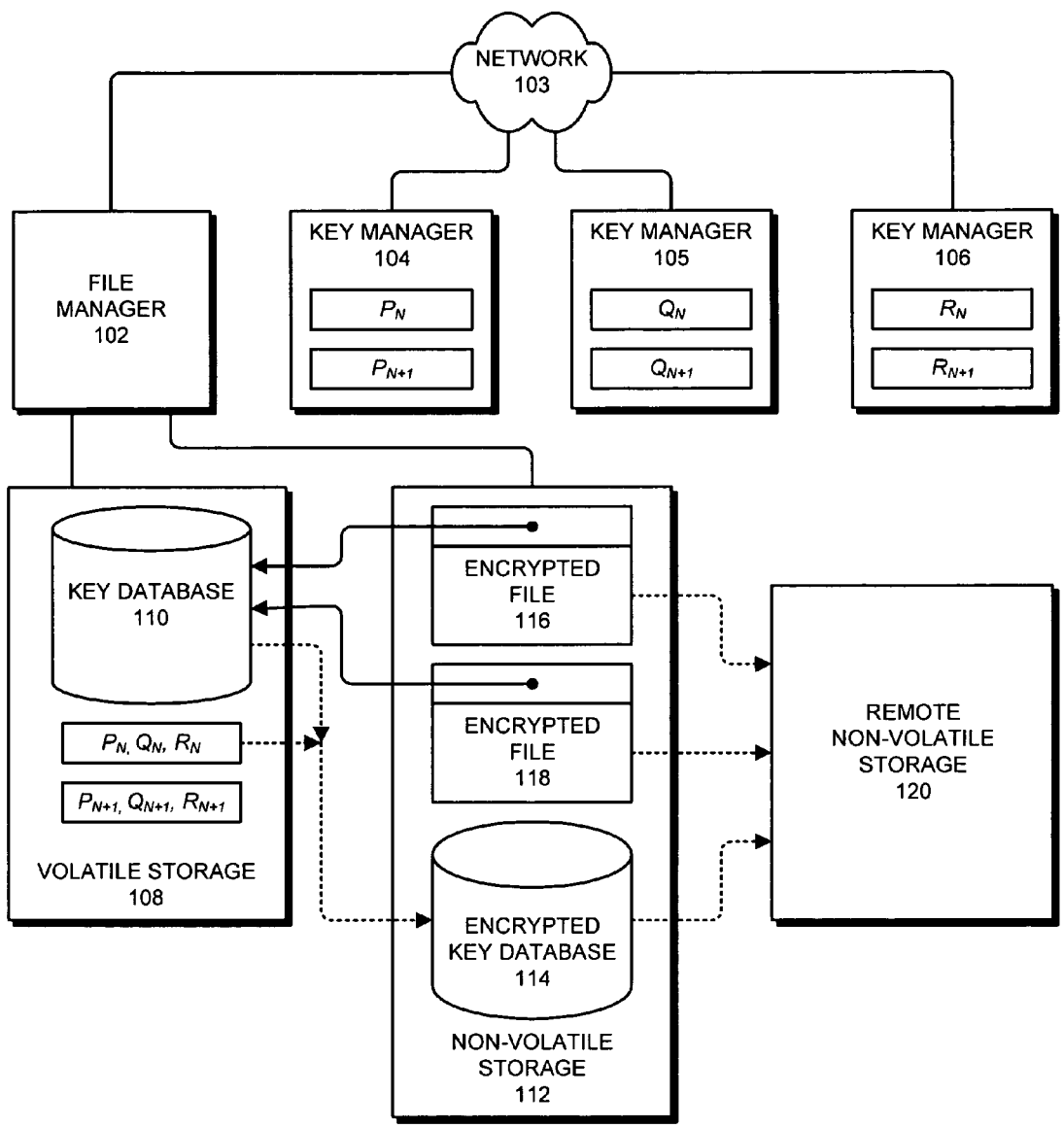
FIG. 1 illustrates both a file manager and associated key managers in accordance with an embodiment of the present invention.

FIG. 1 illustrates both a file manager 102 and a number of key managers 104-105 in accordance with an embodiment of the present invention. File manager 102 can generally include any type of computer system or device that can manage files. Note that all accesses to a set of files are performed though file manager 102, which is trusted to enforce access, and which can access everything except deleted data.

File manager 102 is coupled to both volatile storage 108 and non-volatile storage 112. Volatile storage 108 can include any type of semiconductor-based random access memory, such as SRAM or DRAM memory. Non-volatile storage 112 can include any type of non-volatile memory that can hold data when powered down. This includes, but is not limited to, magnetic storage, flash memory, ROM, EPROM, EEPROM, and battery-backed-up RAM. As is illustrated by dashed lines in FIG. 1, backups of items in non-volatile storage 112 are periodically propagated to remote non-volatile storage 120, or alternatively, to a local backup device, such as a tape drive.

File manager 102 communicates with a number of key managers 104-106. These key managers 104-106 are similar in concept to the "ephemerizer" described in U.S. patent application Ser. No. 10/959,928, filed on 5 Oct. 2004, entitled "Method and Apparatus for Using Secret Keys to Make Data Permanently Unreadable," by inventor Radia J. Perlman, which is incorporated by reference in this application. Also see a related system disclosed in U.S. Pat. No. 6,363,480, entitled "Ephemeral Decryptability," by inventor Radia J. Perlman.

However, unlike the ephemerizer, which maintains one key per expiration time, the key managers 104-106 hold at least two keys per client (file manager). As is illustrated in FIG. 1, the two keys are $P_N$ (for time N) and $P_{N+1}$ (for time N+1). Only after file manager 102 is assured that its database of keys has been safely backed up with key $P_{N+1}$, can key managers 104-106 be notified that they should delete key $P_N$. Note keys $P_N$ and $P_{N+1}$ can be replicated across multiple key managers 104-106 for fault-tolerance purposes. Also note that although the system illustrated in FIG. 1 maintains two keys per file manager, in general the system can maintain a larger number of keys for each file manager.

Note that although the following discussion is written, for simplicity, as if there is a single key manager, in general multiple key managers could be used, each with different sets of public keys. For example, in a one-out-of-n scheme, a key X would be separately stored, encrypted with a different public key for each key manager (e.g., $P_N$, $R_N$ and $Q_N$). Or, X could be broken up into n shares for recovery in a k-out-of-n scheme, and each share stored encrypted with one of the key managers' public keys.

As is illustrated in FIG. 1, file manager 102 maintains copies of files 116 and 118 in encrypted form in non-volatile storage 112. File manager 102 also maintains a key database 110 in volatile storage 108, which contains copies of keys for all active (or recoverable) files. File manager 102 additionally maintains a backup copy of key database 110, which has been encrypted with key $P_N$, in non-volatile storage 112 (see encrypted key database 114 in FIG. 1).

If file manager 102 crashes, it interacts with key managers 104-106 to decrypt encrypted key database 114, and to store the decrypted result in volatile storage 108. At all times, the encrypted copy 114 of the key database in local non-volatile storage and a most-recent backup of the key database in remote non-volatile storage 120 are recoverable, either with key $P_N$ or key $P_{N+1}$.

Note that interactions with key managers 104-106 can be accomplished with blind decryption (as explained in the Sun Microsystems Laboratory technical report no. TR-2005-140, entitled, "The Ephemerizer: Making Data Disappear," February 2005), or it can be accomplished with any sort of secure exchange with key managers 104-106, such as using the SSL (Secure Socket Layer) protocol or using the IPsec (IP security) protocol, wherein the protocol uses either public keys or shared secret keys. Also, the key database can be encrypted in a k-out-of-n scheme with n key managers, such that as long as k key managers are available (and haven't prematurely lost the key), the database is decryptable, and as long as n−k+1 of the key managers do indeed delete the key when demanded, the deleted data is unreadable. Note that blind decryption places less trust in the key manager, since the key manager will not be able to retain any values (other than old keys) with which to decrypt old backups.

An example key database would be where all the keys of active or recoverable files (files that have been deleted but not "securely deleted") are kept encrypted with some randomly chosen key K. K is also stored, encrypted with key $P_N$, which is maintained by the key managers. Hence, to decrypt the key database, K must be recovered by interacting with k of the key managers.

Note that key $P_N$ can be a public key or a secret key. If it is blindable (through for instance, one of the three functions in the above-referenced Sun Microsystems Laboratory Technical Report), then interaction with the key manager can be accomplished through blind decryption, which will be more secure.

If the environment is such that there is no possibility for eavesdroppers, then there can be a simple interaction where the encrypted K is sent to the key manager, which returns K, or where the key manager's key $P_N$ is sent to the file manager 102, which retains that key, but only in volatile storage 108. The most secure way of doing it, though, is to use public keys for the key manager, and blind decryption.

Note that the communications between the file manager and the key manager can be accomplished through some secure interaction, such as doing mutual authentication based on shared secrets or public keys, and establishing a security association through a protocol such as IPsec or SSL, and then having the key manager send the secret key, or encrypt a secret key of the file manager's choice (to be used for encrypting the key database).

Alternatively, the key manager can send the file manager a public key. This public key can also be learned by the file manager securely through other means, such as a certificate, signed by someone that file manager trusts, being posted in a place accessible to the file manager.

Encrypting a File

Figure 2:
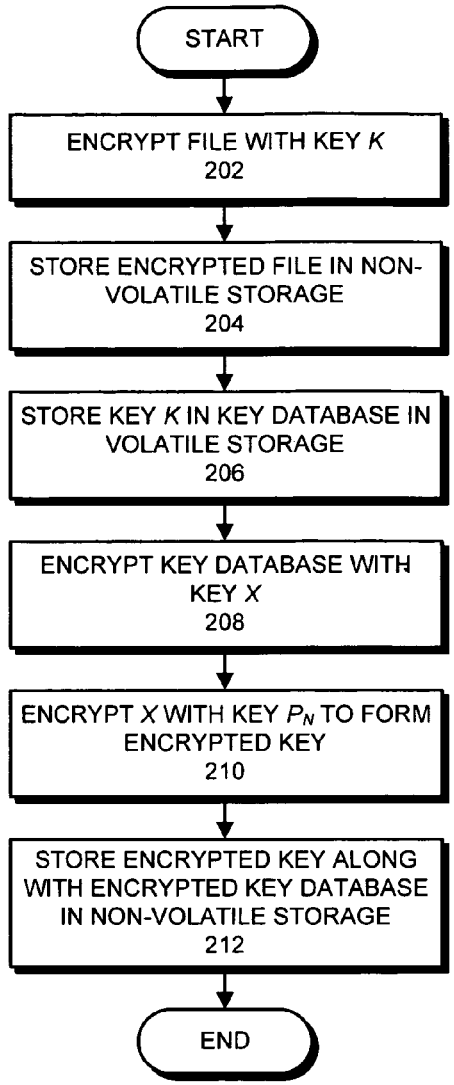
FIG. 2 presents a flow chart illustrating how a file and the key database are encrypted and stored in accordance with an embodiment of the present invention.

FIG. 2 presents a flow chart illustrating how a file and the key database are encrypted and stored in accordance with an embodiment of the present invention. First, the system encrypts the file with a randomly generated key K (step 202), and stores the encrypted file in nonvolatile storage (step 204). The key K is also stored in a key database in volatile storage (step 206). Next, the system encrypts the key database with a randomly generated key X (step 208).

The system also encrypts the key X with a key $P_N$, which is maintained by the key manager (step 210). If the encryption process is performed with a public key $P_N$, then it can be done locally at the file manager and the key manager maintains a corresponding private key. On the other hand, if $P_N$ is a secret key, then key manager maintains a copy of the secret key $P_N$ and the file manager has to interact with the key manager to obtain $P_N$ securely, or alternatively to get a locally-generated secret X, encrypted by the key manager, with X stored in volatile storage, and X encrypted with $P_N$ stored in nonvolatile storage.

Finally, the system stores the encrypted key and the encrypted key database in the non-volatile storage (step 212).

Making a File Permanently Unreadable

Figure 3:
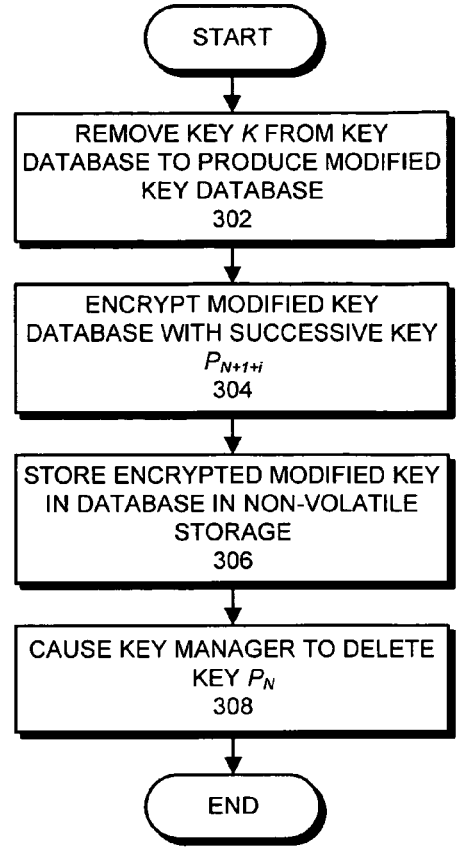
FIG. 3 presents a flow chart illustrating the process of making a file permanently unreadable in accordance with an embodiment of the present invention.

FIG. 3 presents a flow chart illustrating the process of making a file permanently unreadable in accordance with an embodiment of the present invention. First, the file manager removes the key K associated with the encrypted file from the key database to produce a modified key database (step 302). Next, the file manager encrypts the modified key database with a successive key $P_{N+i}$ (step 304). The file manger then stores the encrypted modified key database in non-volatile storage (step 306). After the encrypted modified key database has been committed to non-volatile storage (or additionally committed to backup storage, or remote non-volatile storage), the file manager eventually instructs the key manager to delete the previous key $P_N$ (step 308). This makes the file permanently unreadable if at the last time the key database contained the key K and was encrypted, it was encrypted with the key $P_N$.

Note that in general, the key database at the file manager is updated as files get created and deleted. The key database is also periodically written out to nonvolatile storage, at the file manager's discretion (perhaps every time unit, or perhaps every time the key database is modified). Moreover, there are various stages of nonvolatile storage (like off-site, replicated, versus solely local). At some time the file manager can start using the next version of the key, and at some time the key manager can delete the oldest key, perhaps when informed to do so by the file manager, or perhaps periodically.

Restoring the Key Database

Figure 4:
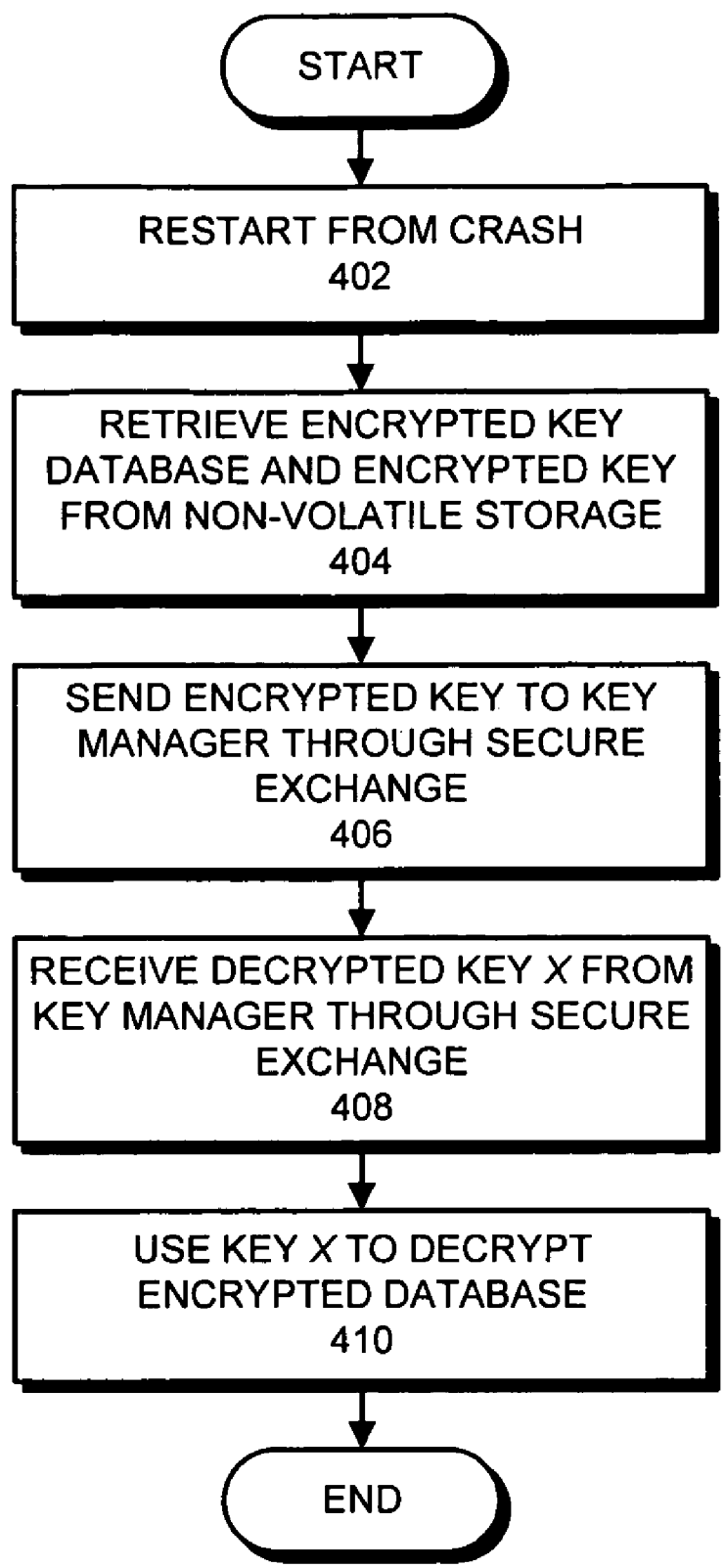
FIG. 4 presents a flow chart illustrating the process of restoring a key database upon restarting a file manager that has crashed, in accordance with an embodiment of the present invention.

FIG. 4 presents a flow chart illustrating the process of restoring a key database upon restarting a file manager that has crashed, in accordance with an embodiment of the present invention. During a restart from a crash (step 402), the file manager system retrieves the encrypted key database and the associated encrypted key from non-volatile storage (step 404).

Next, the file manager then causes the encrypted key to be decrypted. If the encrypted key is encrypted with a shared secret, the file manager obtains the shared secret from the key manager through a secure exchange. The file manager then uses the shared secret to decrypt the encrypted key to restore key X.

On the other hand, if the encrypted key is encrypted with a public key, the file manager sends the encrypted key using a secure exchange to the key manager (step 406). The key manager then uses its corresponding private key to decrypt the encrypted key, thereby restoring the key X. The file manager then receives the decrypted key X from the key manager through a secure exchange (step 408). Finally, the file manager uses the key X to decrypt the encrypted database (step 410). The file manager is subsequently able to use the key in the key database to decrypt encrypted files.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing files which facilitates making the files permanently unreadable, comprising:
    encrypting a file with a key K at a file manager;
    storing the encrypted file in non-volatile storage;
    storing the key K in a key database in volatile storage at the file manager;
    encrypting the key database, wherein encrypting the key database involves encrypting the key database with a key X and encrypting the key X with a key PN to form an encrypted key; and
    storing the encrypted key database in non-volatile storage, wherein storing the encrypted key database in non-volatile storage involves storing the encrypted key and the encrypted key database in non-volatile storage;
    wherein a key that can be used to decrypt the encrypted key database is maintained by a key manager, and is not maintained in non-volatile form by the file manager, whereby if the file manager crashes, losing the contents of local volatile storage, the file manager must interact with the key manager to decrypt the encrypted key database.

2. The method of claim 1, wherein PN is a public key, which is associated with a corresponding private key maintained by the key manager.

3. The method of claim 1, wherein PN is a secret key, which is maintained by the key manager.

4. The method of claim 1, wherein the method further comprises making a file permanently unreadable by:
    removing the key K from the key database at the file manager to produce a modified key database; and
    encrypting the modified key database with a successive key PN+i to form an encrypted modified key database, wherein the successive key PN+i is maintained by the key manager, which involves maintaining a corresponding private key if PN+i is a public key;
    storing the encrypted modified key database in non-volatile storage; and
    eventually causing the key manager to delete the key PN, which involves deleting a corresponding private key if PN is a public key.

5. The method of claim 1, wherein upon recovering from a crash, the method further comprises:
retrieving the encrypted key database and the encrypted key from non-volatile storage;
communicating with the key manager to decrypt the encrypted key, thereby restoring the key X; and
using the key X to decrypt the encrypted key database at the file manager, thereby enabling the file manager to decrypt encrypted files.

6. The method of claim 5, wherein communicating with the key manager to decrypt the encrypted key can involve:
communicating with the key manager through a secure exchange; or
using a blind decryption scheme to decrypt the encrypted key.

7. The method of claim 1, wherein the key that can be used to decrypt the encrypted key database is maintained by multiple key managers.

8. The method of claim 1, wherein the key database is encrypted using a k-out-of-n scheme with n key managers, such that as long as k key managers remain available, the encrypted key database can be decrypted.

9. The method of claim 1, wherein storing the encrypted key database in non-volatile storage involves:
storing a copy of the encrypted key database in local non-volatile storage associated with the file manager; and
storing additional copies of the encrypted key database in remote non-volatile storage.

10. A computer-readable storage medium storing instructions that when executed by a computer cause the computer to perform a method for managing files which facilitates making the files permanently unreadable, the method comprising:
encrypting a file with a key K at a file manager;
storing the encrypted file in non-volatile storage;
storing the key K in a key database in volatile storage at the file manager;
encrypting the key database, wherein encrypting the key database involves encrypting the key database with a key X and encrypting the key X with a key PN to form an encrypted key; and
storing the encrypted key database in non-volatile storage, wherein storing the encrypted key database in non-volatile storage involves storing the encrypted key and the encrypted key database in non-volatile storage; and
wherein a key that can be used to decrypt the encrypted key database is maintained by a key manager, and is not maintained in non-volatile form by the file manager, whereby if the file manager crashes, losing the contents of local volatile storage, the file manager must interact with the key manager to decrypt the encrypted key database.

11. The computer-readable storage medium of claim 10, wherein PN is a public key, which is associated with a corresponding private key maintained by the key manager.

12. The computer-readable storage medium of claim 10, wherein PN is a secret key, which is maintained by the key manager.

13. The computer-readable storage medium of claim 10, wherein the method further comprises making a file permanently unreadable by:
removing the key K from the key database at the file manager to produce a modified key database; and
encrypting the modified key database with a successive key PN+i to form an encrypted modified key database, wherein the successive key PN+i is maintained by the key manager, which involves maintaining a corresponding private key if PN+i is a public key;
storing the encrypted modified key database in non-volatile storage; and
eventually causing the key manager to delete the key PN, which involves deleting a corresponding private key if PN is a public key.

14. The computer-readable storage medium of claim 10, wherein upon recovering from a crash, the method further comprises:
retrieving the encrypted key database and the encrypted key from non-volatile storage;
communicating with the key manager to decrypt the encrypted key, thereby restoring the key X; and
using the key X to decrypt the encrypted key database at the file manager, thereby enabling the file manager to decrypt encrypted files.

15. The computer-readable storage medium of claim 14, wherein communicating with the key manager to decrypt the encrypted key can involve:
communicating with the key manager through a secure exchange; or
using a blind decryption scheme to decrypt the encrypted key.

16. The computer-readable storage medium of claim 10, wherein the key that can be used to decrypt the encrypted key database is maintained by multiple key managers.

17. The computer-readable storage medium of claim 10, wherein the key database is encrypted using a k-out-of-n scheme with n key managers, such that as long as k key managers remain available, the encrypted key database can be decrypted.

18. The computer-readable storage medium of claim 10, wherein storing the encrypted key database in non-volatile storage involves:
storing a copy of the encrypted key database in local non-volatile storage associated with the file manager; and
storing additional copies of the encrypted key database in remote non-volatile storage.

19. An apparatus that managing files in a manner which facilitates making the files permanently unreadable, comprising:
a computer system performing the functions of a file manager;
an encryption mechanism within the file manager configured to encrypt a file with a key K;
a storage mechanism within the file manager configured to store the encrypted file in non-volatile storage;
wherein the encryption mechanism is additionally configured to store the key K in a key database located in volatile storage at the file manager;
wherein the encryption mechanism is additionally configured to encrypt the key database, wherein encrypting the key database involves encrypting the key database with a key X and encrypting the key X with a key PN to form an encrypted key;
wherein the storage mechanism is additionally configured to storing the encrypted key database in non-volatile storage, wherein storing the encrypted key database in non-volatile storage involves storing the encrypted key and the encrypted key database in non-volatile storage; and
wherein a key that can be used to decrypt the encrypted key database is maintained by a key manager, and is not maintained in non-volatile form by the file manager, whereby if the file manager crashes, losing the contents of local volatile storage, the file manager must interact with the key manager to decrypt the encrypted key database.

* * * * *

UNITED STATES PATENT AND TRADEMARK OFFICE
CERTIFICATE OF CORRECTION

PATENT NO. : 7,596,696 B1  Page 1 of 1
APPLICATION NO. : 11/214958
DATED : September 29, 2009
INVENTOR(S) : Radia J. Perlman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Fourteenth Day of December, 2010

David J. Kappos
*Director of the United States Patent and Trademark Office*